US007849685B2

(12) United States Patent
Yamazaki et al.

(10) Patent No.: US 7,849,685 B2
(45) Date of Patent: Dec. 14, 2010

(54) CONTROL DEVICE FOR HYDRAULIC CYLINDER AND OPERATING MACHINE INCLUDING CONTROL DEVICE

(75) Inventors: Yoichiro Yamazaki, Hiroshima (JP); Nobuyoshi Hataoka, Hiroshima (JP); Hiroshi Togo, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 441 days.

(21) Appl. No.: 11/460,877

(22) Filed: Jul. 28, 2006

(65) Prior Publication Data

US 2007/0033934 A1 Feb. 15, 2007

(30) Foreign Application Priority Data

Aug. 11, 2005 (JP) ............................ 2005-233106

(51) Int. Cl.
*F16D 31/02* (2006.01)

(52) U.S. Cl. .......................................... 60/403; 60/445

(58) Field of Classification Search ................... 60/403, 60/445, 446; 91/397
See application file for complete search history.

(56) References Cited

U.S. PATENT DOCUMENTS

| | | | | |
|---|---|---|---|---|
| 4,399,653 A * | 8/1983 | Pylat | .......................... | 60/446 |
| 4,741,159 A * | 5/1988 | Gunda et al. | .................. | 60/446 |
| 5,953,976 A * | 9/1999 | Bueter | ......................... | 91/397 |

FOREIGN PATENT DOCUMENTS

| | | |
|---|---|---|
| CN | 1566717 A | 1/2005 |
| GB | 2 413 862 | 11/2005 |
| JP | 01-139101 | 9/1989 |
| JP | 04-181003 | 6/1992 |
| JP | 06-32702 | 4/1994 |
| JP | 2004-100759 | 4/2004 |
| JP | 2004-293628 | 10/2004 |

* cited by examiner

*Primary Examiner*—F. Daniel Lopez
(74) *Attorney, Agent, or Firm*—Oblon, Spivak, McClelland, Maier & Neustadt, L.L.P.

(57) ABSTRACT

A control device includes an arm cylinder having a cylinder body and a piston that slides inside the cylinder body and a pump that supplies working oil to the arm cylinder, and decelerates the piston when it approaches a stroke end of the arm cylinder by adjusting a supply rate of the working oil supplied from the pump to the arm cylinder and a discharge rate of the working oil discharged from the arm cylinder. The position at which the piston starts decelerating is set further from the stroke end as the moving speed of the piston becomes higher.

3 Claims, 7 Drawing Sheets

CONTROL DEVICE FOR HYDRAULIC CYLINDER AND OPERATING MACHINE INCLUDING CONTROL DEVICE

BACKGROUND OF THE INVENTION

1. Field of the Invention

The present invention relates to control devices for hydraulic cylinders, and relates to operating machines including the same.

2. Description of the Related Art

A control device that prevents damage to a hydraulic cylinder by controlling the drive of a piston when a stroke end is approached is disclosed in, for example, Japanese Unexamined Patent Application Publication No. 2004-293628.

In this device, it is determined whether the position of the piston is located in a predetermined stroke-end area on the basis of the pressure inside the hydraulic cylinder. When it is determined that the position is in the predetermined area, the piston is decelerated by regulating supply pressure and discharge pressure to the hydraulic cylinder.

However, this device starts uniformly decelerating the piston when the piston approaches a position a predetermined distance from the stroke end (stroke-end area). Therefore, when the speed of the piston that has reached this position is excessively high, a large force depending on the inertia is applied to the piston. As a result, the internal pressure of the cylinder (internal pressure of the discharge section) may be excessively increased so as to damage the cylinder.

In order to reliably prevent such damage, the deceleration may be started earlier by expanding the stroke-end area. However, in such cases, the deceleration timing is advanced even when the speed of the piston is not excessively high, resulting in reduced working efficiency.

SUMMARY OF THE INVENTION

It is an object of the present invention to provide a control device for a hydraulic cylinder capable of preventing damage to the hydraulic cylinder without marked reduction in working efficiency, and to provide an operating machine including the same.

The control device for the hydraulic cylinder according to the present invention includes the following basic configuration.

That is, the control device according to the present invention for the hydraulic cylinder having a cylinder body and a piston that slides inside the cylinder body includes a supply source that supplies working oil to the hydraulic cylinder and decelerates the piston when it approaches a stroke end of the cylinder body by adjusting a supply rate of the working oil supplied from the supply source to the hydraulic cylinder and a discharge rate of the working oil discharged from the hydraulic cylinder. The control device further includes decelerating means that decelerates the piston and deceleration-setting means that sets a position at which the piston starts decelerating such that the position is set further from the stroke end as the moving speed of the piston becomes higher.

According to the present invention, the deceleration-start position of the piston can be set further from the stroke end as the moving speed becomes larger. Since the piston that approaches the stroke end at a high speed is decelerated in good time, the force depending on the inertia of the piston can be canceled before the stroke end, thereby preventing the internal pressure of the cylinder body from excessively increasing.

In contrast, when the moving speed is low, the deceleration-start position can be set to a position adjacent to the stroke end depending on the speed. Therefore, when the piston approaches the stroke end at low speed, the piston can be rapidly moved to the vicinity of the stroke end (deceleration-start position).

Therefore, according to the present invention, damage to the hydraulic cylinder can be prevented without marked reduction in working efficiency by regulating the excessive rise in the internal pressure of the cylinder body.

According to the control device, it is preferable that the decelerating means be disposed between the hydraulic cylinder and the supply source, and include first flow-adjusting means for changing the supply rate of the working oil supplied to the hydraulic cylinder and the discharge rate of the working oil discharged from the hydraulic cylinder; the deceleration-setting means include detecting means for detecting the moving speed of the piston and flow-controlling means for reducing the piston speed by operating the first flow-adjusting means such that the supply rate and the discharge rate are reduced; and the flow-controlling means start operating the first flow-adjusting means earlier as the piston speed that is detected by the detecting means becomes higher.

According to this structure, the piston of the hydraulic cylinder can be decelerated by reducing the supply rate of the working oil supplied to the hydraulic cylinder and the discharge rate of the working oil discharged from the hydraulic cylinder.

Also, it is preferable that the decelerating means further include second flow-adjusting means for changing a discharge flow rate of the working oil discharged from the supply source; and the flow-controlling means reduce the discharge flow rate of the working oil discharged from the supply source by operating the second flow-adjusting means depending on the supply rate of the working oil supplied to the hydraulic cylinder during the deceleration of the piston, the supply rate being adjusted by the first flow-adjusting means.

According to this structure, the discharge flow rate of the working oil discharged from the supply source can be reduced during the deceleration control of the piston in which the supply rate of the working oil supplied to the hydraulic cylinder is regulated. Therefore, the rates of upstream supply and downstream supply of the working oil having the first flow-adjusting means interposed therebetween can be balanced, and thus the accuracy of the deceleration control of the piston can be improved.

In the control device, it is preferable that the pair of the supply source and the first flow-adjusting means include a plurality of pairs; the working oil from these pairs be joined and supplied to the common hydraulic cylinder, and the working oil discharged from the hydraulic cylinder be distributed to the corresponding first flow-adjusting means such that the flow rate is adjusted; the decelerating means further include operating means for operating the first flow-adjusting means in response to user operations and forced-operating means capable of forcedly operating at least one of the first flow-adjusting means independently of the operating status of the operating means; and the flow-controlling means reduce the supply rate of the working oil supplied to the hydraulic cylinder and the discharge rate of the working oil discharged from the hydraulic cylinder by controlling the forced-operating means during the deceleration control of the piston.

According to this structure, the common hydraulic cylinder can be driven by a plurality of supply sources such that a large driving force is applied to the hydraulic cylinder during normal operation. On the other hand, the piston can be decelerated by reducing the supply rate of the working oil supplied to the hydraulic cylinder and the discharge rate of the working oil discharged from the hydraulic cylinder using at least one of the first flow-adjusting means during the deceleration control of the piston while part of the first flow-adjusting means, which includes multiple units, is continued to be driven in response to the operation of the operating means.

Furthermore, the flow-controlling means may determine whether the detecting means or the forced-operating means is under an abnormal condition during the deceleration control of the piston; and when it is determined that the detecting means or the forced-operating means is under an abnormal condition, the first flow-adjusting means, which is not driven by the forced-operating means, may be operated such that the supply rate of the working oil supplied to the hydraulic cylinder and the discharge rate of the working oil discharged from the hydraulic cylinder are minimized.

According to this structure, the piston can be decelerated by one of the first flow-adjusting means even if the detecting means or the forced-operating means is under an abnormal condition, i.e., even if it is determined that another first flow-adjusting means, which is driven by the forced-operating means, cannot be controlled normally. Thus, higher safety can be achieved.

The decelerating means may include second flow-adjusting means for changing a discharge flow rate of the working oil discharged from the supply source, the deceleration-setting means may include detecting means for detecting the moving speed of the piston and flow-controlling means for reducing the piston speed by operating the second flow-adjusting means such that the supply rate is reduced, and the flow-controlling means may start operating the second flow-adjusting means earlier as the piston speed that is detected by the detecting means becomes higher.

According to this structure, the piston can be decelerated by reducing the discharge flow rate of the working oil discharged from the supply source such that the supply rate of the working oil supplied to the hydraulic cylinder is reduced.

On the other hand, it is preferable that the hydraulic cylinder include mechanical cushioning means for decelerating the piston as the piston is moved from a predetermined cushioning-start position in a piston body to the stroke end by reducing the discharge rate of the working oil discharged from the hydraulic cylinder.

According to this structure, the piston can be decelerated more reliably in addition to the deceleration control of the piston by the deceleration-setting means.

According to another aspect of the present invention, the operating machine includes the control device for the hydraulic cylinder, and is characterized in that the hydraulic cylinder includes a rod that extends and contracts with respect to the piston body as the piston moves; and a working attachment is driven by extension and contraction of the rod.

According to this structure, damage to the hydraulic cylinder can be regulated by decelerating the piston when it approaches the stroke end of the cylinder body during driving of the working attachment by extension and contraction of the rod of the hydraulic cylinder.

In particular, in the operating machine, the moving speed of the piston tends to be increased since a force depending on the inertia due to the weight of the working attachment is applied to the piston during driving of the working attachment. However, with the above-described structure, the internal pressure of the cylinder body can be prevented from excessively increasing by setting the deceleration-start position of the piston further from the stroke end depending on the moving speed of the piston even when the force depending on the inertia of the working attachment is applied to the piston. Thus, damage to the hydraulic cylinder can be prevented.

DESCRIPTION OF THE PREFERRED EMBODIMENTS

A preferred embodiment of the present invention will now be described with reference to the drawings.

Figure 1:
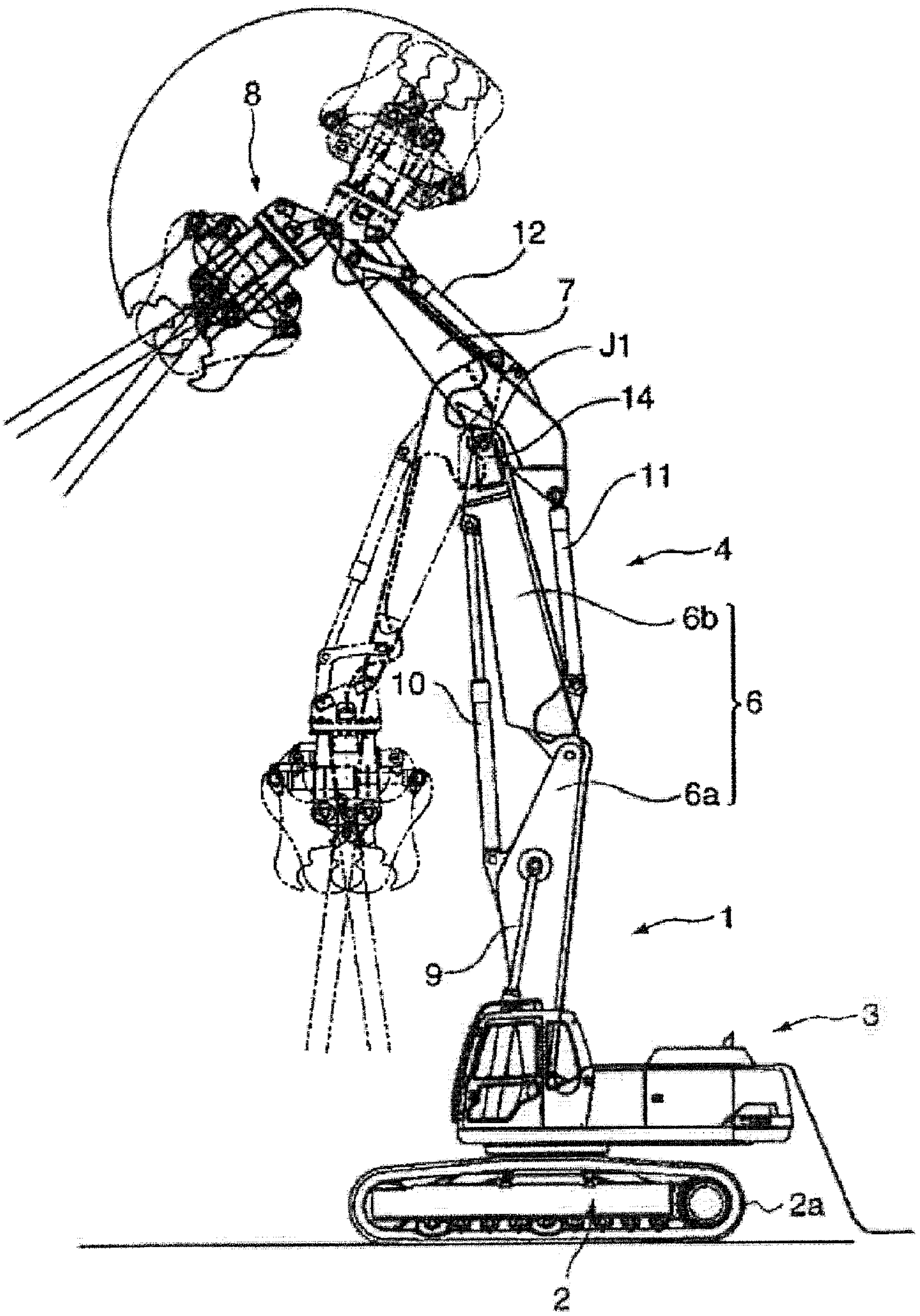
FIG. 1 illustrates the entire structure of a crawler construction machine according to an embodiment of the present invention.
Figure 2:
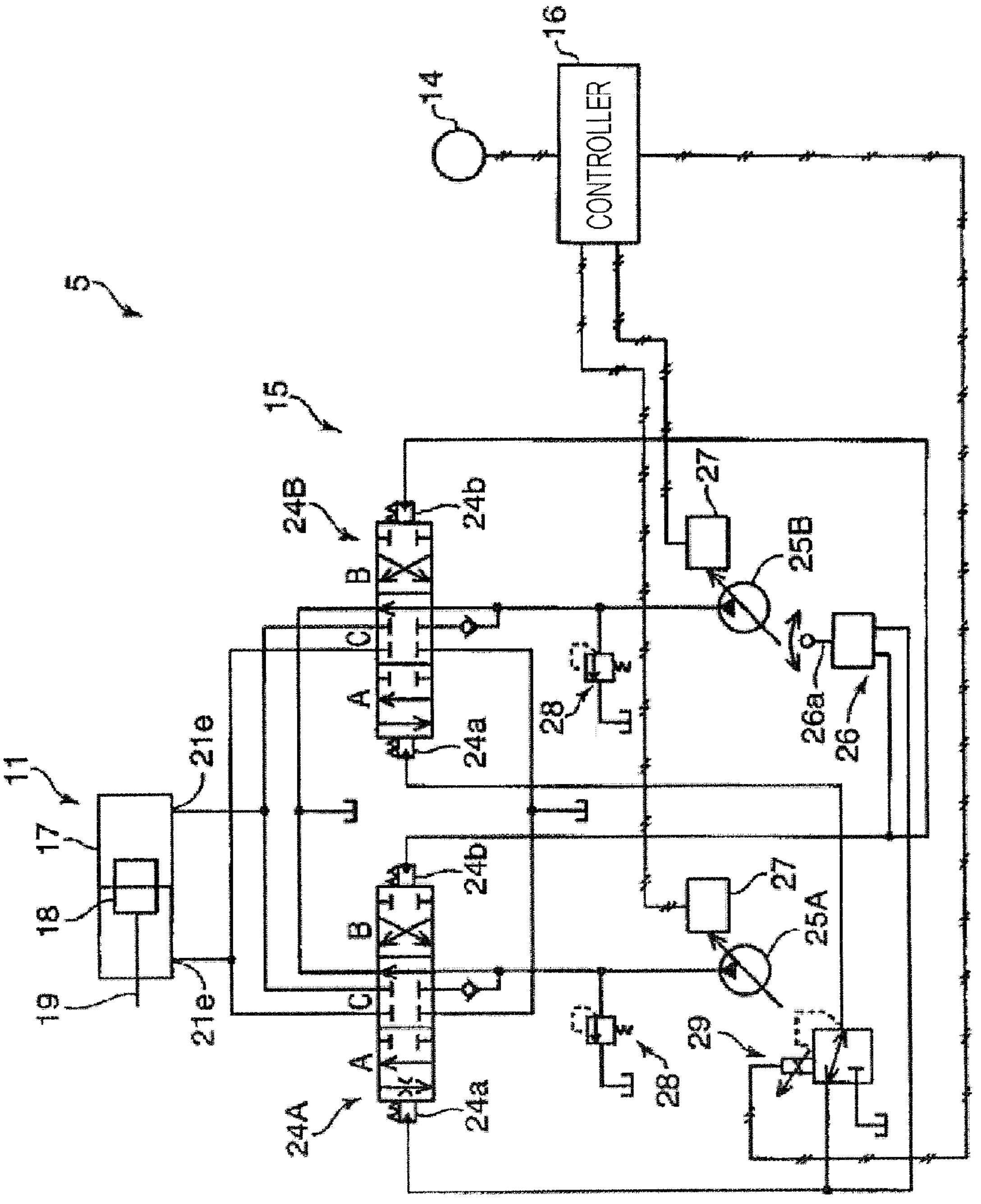
FIG. 2 is a schematic diagram illustrating a control device of the crawler construction machine shown in FIG. 1.

FIG. 1 illustrates the entire structure of a crawler construction machine according to an embodiment of the present invention. FIG. 2 is a schematic diagram illustrating a control device of the crawler construction machine shown in FIG. 1.

A construction machine, which is an exemplary operating machine, to which the present invention is applied is described with reference to the drawings. A construction machine 1 includes a traveling section 2 having crawlers 2*a*, a rotatable section 3 mounted on the traveling section 2, a working attachment 4 installed in the front of the rotatable section 3 so as to be movable up and down, and a control device 5 (see FIG. 2) that controls the driving of the working attachment 4.

The working attachment 4 includes a two-part boom 6 having a first boom 6*a* and a second boom 6*b*, and an arm 7 connected to an end of the second boom 6*b*. A crusher 8 is attached to an end of the arm 7.

The first boom 6*a* moves up or down by a first boom cylinder 9 being extended or contracted, and the second boom 6*b* moves up or down by a second boom cylinder 10 being extended or contracted. The arm 7 seesaws up or down around a horizontal shaft J1 by an arm cylinder (hydraulic cylinder) 11 being extended or contracted, and the crusher 8 rotates up or down by a crusher cylinder 12 being extended or contracted. A rotation-angle sensor (detecting means) 14 for detecting the rotation angle of the arm 7 around the horizontal shaft J1 is disposed between the second boom 6*b* and the arm 7.

The control device 5 according to the present invention includes the rotation-angle sensor 14, a hydraulic circuit 15 having supply and discharge routes of working oil supplied to and discharged from the arm cylinder 11, and a controller (flow-controlling means) 16 for adjusting the flow rate of the working oil supplied and discharged by this hydraulic circuit 15.

Figure 3A:
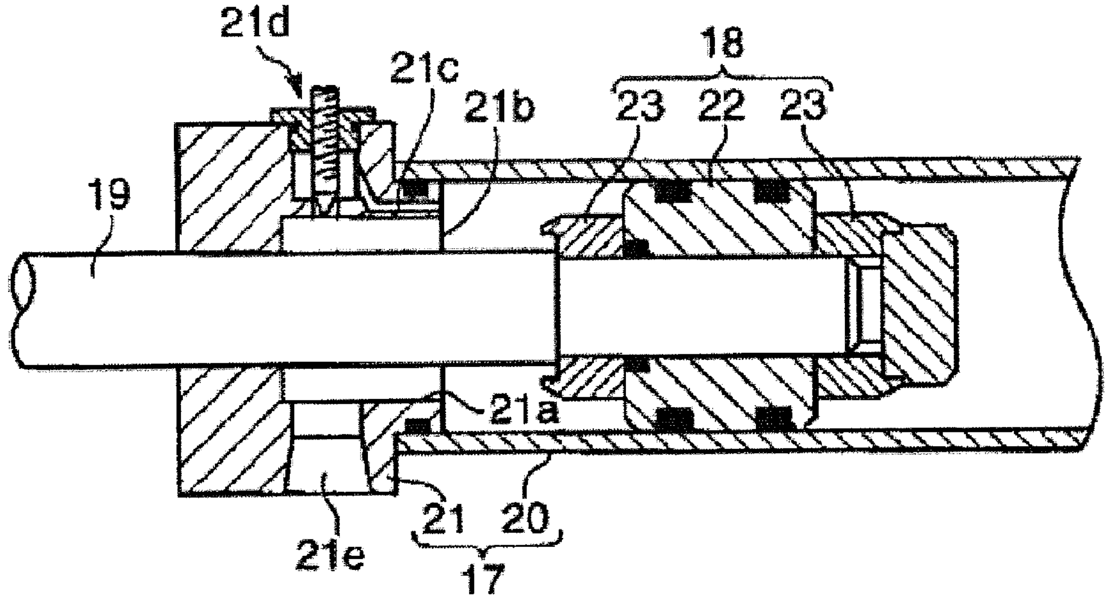
FIGS. 3A and 3B are partially enlarged cross-sectional views of an arm cylinder.
Figure 3B:
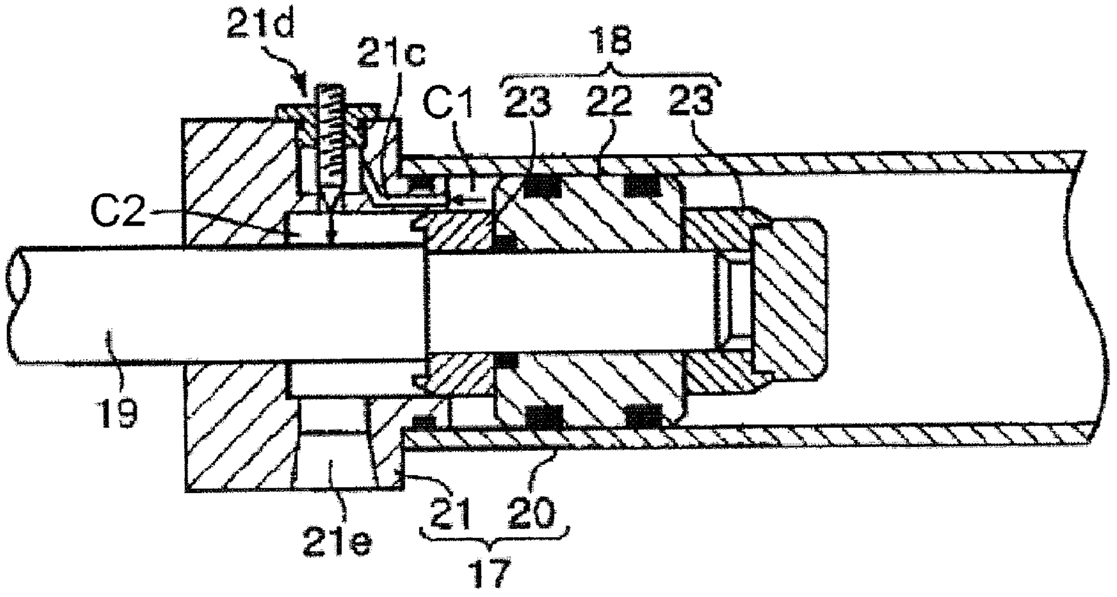

FIGS. 3A and 3B are partially enlarged cross-sectional views of the arm cylinder 11.

With reference to FIGS. 3A and 3B, the arm cylinder 11 includes a cylinder body 17 and a piston 18 that slides inside the cylinder body 17 such that a rod 19 extends and contracts with respect to the cylinder body 17.

The cylinder body 17 includes a tubular member 20 that has a circular cross-section and covers that close both open ends of the tubular member 20. In the drawings, only a cover 21 adjacent to the rod 19 is shown, and a cover adjacent to the head is not shown. Only the cover 21 will be described hereafter. The cover 21 has a hole 21*a* and a shoulder 21*b*, and the hole 21*a* is coaxial with the bore of the tubular member 20 via the shoulder 21*b*. Also, the cover 21 has a bypass route 21*c* passing from the shoulder 21*b* alongside the surface of the hole 21*a* and a throttle valve 21*d* for adjusting the cross section of the flow channel of the bypass route 21*c*. The hole 21*a* is connected to ports 21*e* for supplying and discharging the working oil.

On the other hand, the piston 18 includes a piston body 22 that slides along the inner surface of the tubular member 20 and cushion rings 23 that are attached to either end of the piston body 22. In FIGS. 3A and 3B, the same reference numeral 23 is used for both cushion rings. However, only the cushion ring adjacent to the cover 21 will be described as the cushion ring 23 in the description below. The cushion ring 23 can be inserted into the hole 21*a*.

That is, the arm cylinder 11 has a mechanical cushion mechanism formed of the cover 21 and the cushion ring 23. The state of the piston 18 can be changed from that shown in FIG. 3A to that shown in FIG. 3B. With this structure, when the piston 18 approaches the stroke end of the cylinder body 17 as shown in FIG. 3B, the cushion ring 23 of the piston 18 is hermetically fitted into the hole 21*a*. As a result, the area of the piston 18 adjacent to the stroke end is partitioned into a cushion chamber C1 between the piston body 22 and the shoulder 21*b* and a discharge chamber C2 between the cushion ring 23 and the hole 21*a*. When the piston 18 further proceeds, the working oil inside the cushion chamber C1 is forced to move to the discharge chamber C2 through the bypass route 21*c*. However, due to the limitation of the flow rate imposed by the throttle valve 21*d*, the pressure inside the cushion chamber C1 is increased, and thus braking is applied to the piston 18.

The structure of the hydraulic circuit 15 will now be described with reference to FIG. 2.

The hydraulic circuit 15 includes a pair of pumps (supply sources) 25A and 25B that supply the working oil to the arm cylinder 11 via three-position switching valves (first flow-adjusting means) 24A and 24B, respectively, and a remote-control valve (operating means) 26 that supplies the working oil from a pilot pump (not shown) to the three-position switching valves 24A and 24B. In the description below, the three-position switching valves 24A and 24B are generically referred to as three-position switching valves 24, and the pumps 25A and 25B are generically referred to as pumps 25 when it is not necessary to discriminate these components.

The pumps 25 are of a variable displacement type, and each includes a flow-adjusting section (second flow-adjusting means) 27 that adjusts the discharge flow rate in accordance with commands from the below-mentioned controller 16 described below.

The three-position switching valves 24 are switched between three positions (A, B, and C) as described below. Specifically, the three-position switching valves 24 are retained at neutral positions C when the working oil is not supplied to either pilot ports 24*a* or pilot ports 24*b*, are switched to positions A when the working oil is supplied to the pilot ports 24*a*, and are switched to positions B when the working oil is supplied to the pilot ports 24*b*.

At the neutral positions C, the working oil from the pumps 25 is collected in a first oil tank, and at the same time, discharge routes of the working oil from the arm cylinder 11 are cut off. At the positions A, the working oil from the pumps 25 is supplied to one of the ports 21*e* of the arm cylinder 11 for extending the rod 19, and at the same time, the working oil discharged from the arm cylinder 11 is collected in a second oil tank. At the positions B, the working oil from the pumps 25 is supplied to the other of the ports 21*e* of the arm cylinder 11 for contracting the rod 19, and at the same time, the working oil discharged from the arm cylinder 11 is collected in the second oil tank.

Moreover, strokes from the neutral positions C to the positions A or the positions B of the three-position switching valves 24 change depending on the level of the pilot pressure of the working oil to the pilot ports 24*a* or 24*b*. Thus, the supply rate of the working oil supplied to the arm cylinder 11 and the discharge rate of the working oil discharged from the arm cylinder 11 can be adjusted.

Relief valves 28 for limiting the pressure of the working oil supplied to the arm cylinder 11 to a predetermined value are disposed between the pumps 25 and the three-position switching valves 24.

On the other hand, the remote-control valve 26 can output a contracting command for contracting the rod 19 of the arm cylinder 11 (for rotating the arm 7 upward; see FIG. 1) or an extending command for extending the rod 19 (for rotating the arm 7 downward; see FIG. 1) in response to operation of a lever.

That is, the remote-control valve 26 outputs the contracting command in response to tilting of a lever 26*a* from a neutral position shown in FIG. 2 to the left, and outputs the extending command in response to tilting of the lever 26*a* to the right. The pilot pressure of the working oil that is supplied from the pilot pump (not shown) to the pilot ports 24*a* or 24*b* of the three-position switching valves 24 is increased as the inclination of the lever 26*a* from the neutral position is increased. Similarly, the remote-control valve 26 is operatively associated with the below-mentioned controller 16, and higher current is applied to the flow-adjusting sections 27 as the inclination of the lever 26*a* from the neutral position is increased such that the discharge flow rate of the working oil discharged from the pumps 25 is increased.

Specifically, when the contracting command is output from the remote-control valve 26, the working oil from the pilot pump is supplied to the pilot ports 24*b* while the discharge flow rate of the working oil discharged from the pumps 25 is regulated on the basis of the inclination of the lever 26*a*. In contrast, when the extending command is output, the working oil is supplied to the pilot ports 24*a* while the discharge flow rate of the working oil discharged from the pumps 25 is regulated on the basis of the inclination of the lever 26*a*.

Furthermore, a proportional solenoid valve (forced-operated means) 29 is disposed between the remote-control valve 26 and the pilot port 24*a* of the three-position switching valve 24B. The proportional solenoid valve 29 can change the downstream pressure of the working oil (the pilot pressure to the pilot port 24*a*) in accordance with the commands (supply current) from the below-described controller 16. Therefore, the proportional solenoid valve 29 can adjust the pilot pressure to the pilot port 24*a* of three-position switching valve 24B more preferentially than the outputs from the remote-control valve 26, and thus adjust the supply rate of the working oil supplied to arm cylinder 11 and the discharge rate of the working discharged from the arm cylinder 11.

With reference to FIGS. 1 and 2, the controller 16 is electrically connected to the rotation-angle sensor 14, the flow-adjusting sections 27, and the proportional solenoid valve 29. When the arm 7 is being rotated downward (the rod 19 is extending), the controller 16 decelerates the piston 19 that is heading toward the stroke end of the arm cylinder 11 by operating the flow-adjusting sections 27 and the proportional solenoid valve 29 on the basis of the rotational position of the arm 7 detected by the rotation-angle sensor 14.

Figure 4:
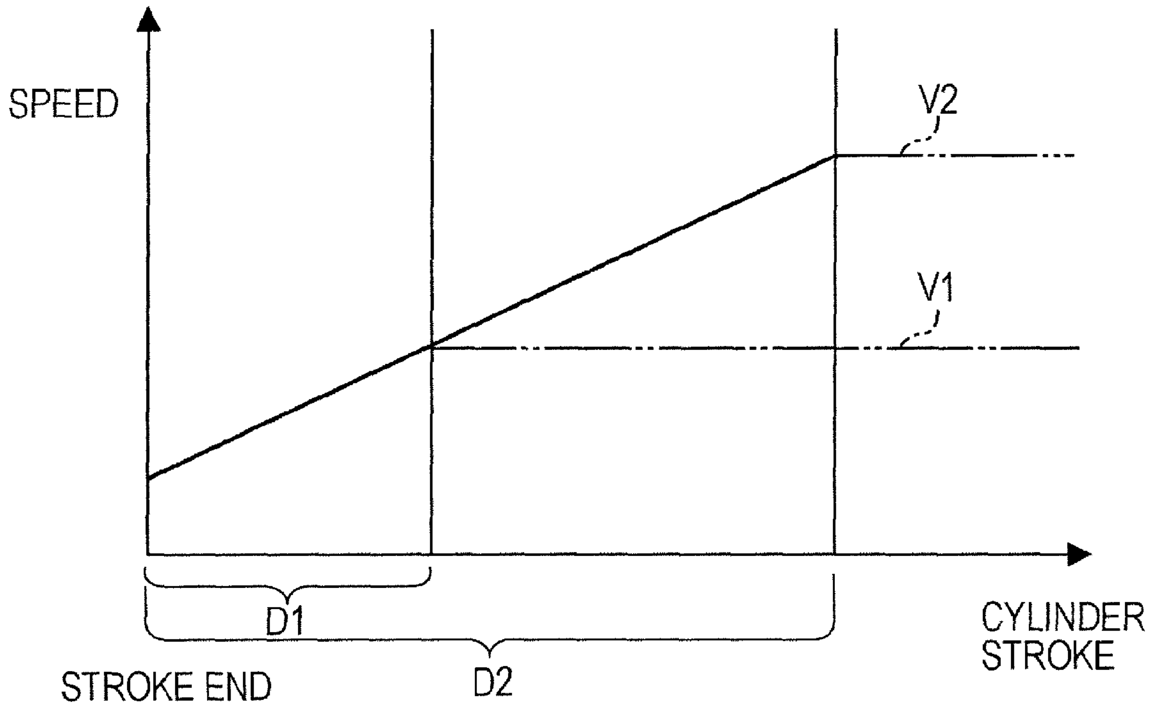
FIG. 4 is a graph schematically illustrating the control of a controller.

Specifically, as shown in FIG. 4, the controller 16 reduces the slowing-down length D1 by setting the deceleration-start position of the piston 18 adjacent to the stroke end when the piston 18 is heading toward the stroke end at a relatively low speed V1, whereas the controller 16 sets the slowing-down length D2 to be longer than the slowing-down length D1 when the piston 18 is heading toward the stroke end at a speed V2 higher than the speed V1. That is, the deceleration-start position of the piston 18 can be set further from the stroke end as the moving speed becomes larger. Since the piston 18 that approaches the stroke end at a high speed is decelerated in good time, the force depending on the inertia of the piston 18 can be canceled before the stroke end, thereby preventing the internal pressure of the cylinder body 17 from excessively increasing.

Figure 5:
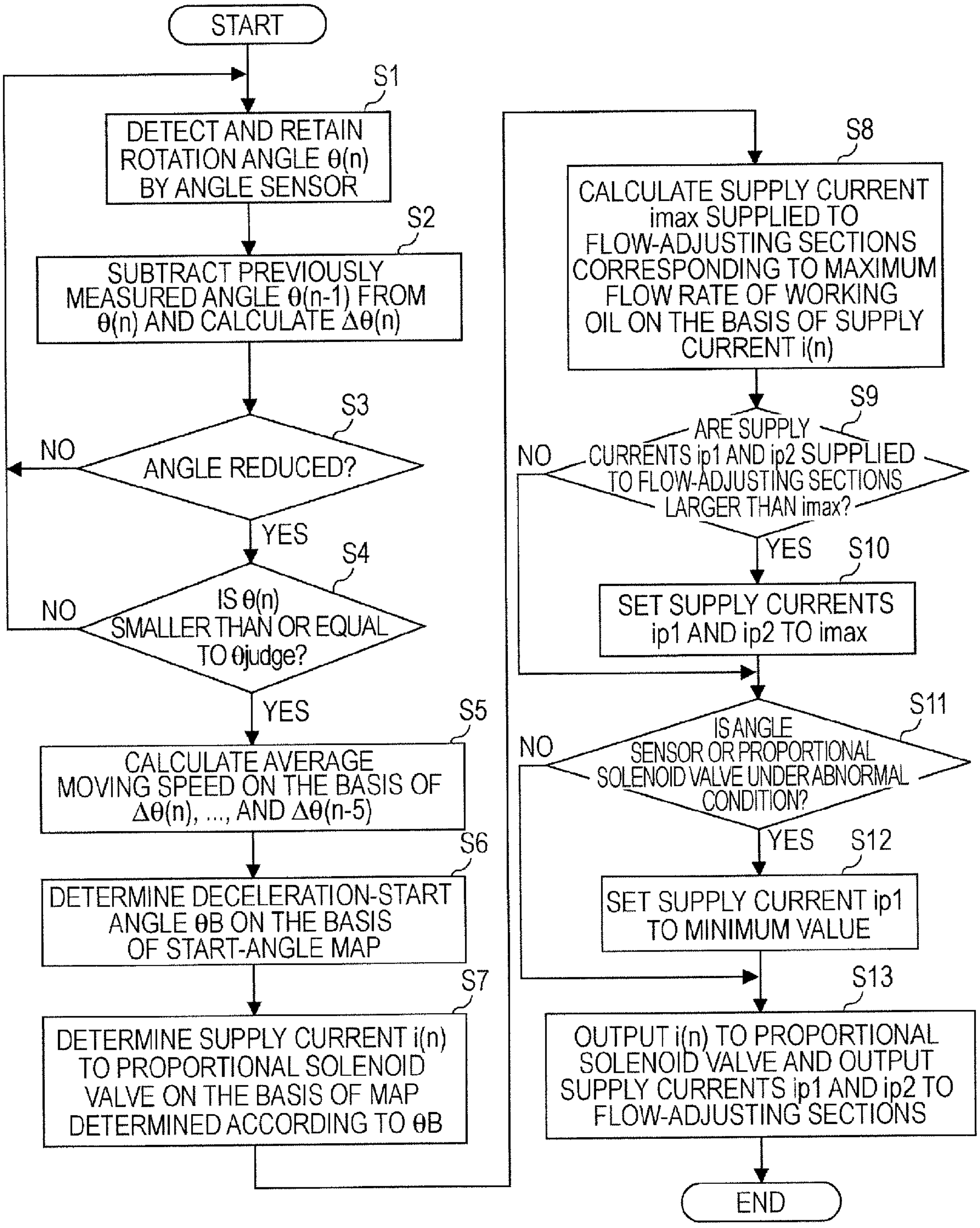
FIG. 5 is a flow chart illustrating the control of the controller.

A process performed by the controller 16 will now be described with reference to FIG. 5.

First, when the process is started, the rotation-angle sensor 14 detects and retains a rotation angle θ(n) of the arm 7 (Step S1). Herein, the rotation angle θ(n) is the angle between the arm 7 and the second boom 6*b* of the two-part boom 6 (see FIG. 1).

Next, an angle difference Δθ(n) is calculated by subtracting the rotation angle θ(n−1) that was previously measured from the rotation angle θ(n) measured in Step S1 (Step S2), and it is determined whether the rotational angle of the arm 7 has been reduced, i.e., the rod 19 is extended, at this time on the basis of the angle difference Δθ(n) (Step S3).

At this time, when it is determined that the rod 19 is not extended, i.e., the rod 19 is suspended or contracted (NO in Step S3), the process returns to Step S1.

Figure 6:
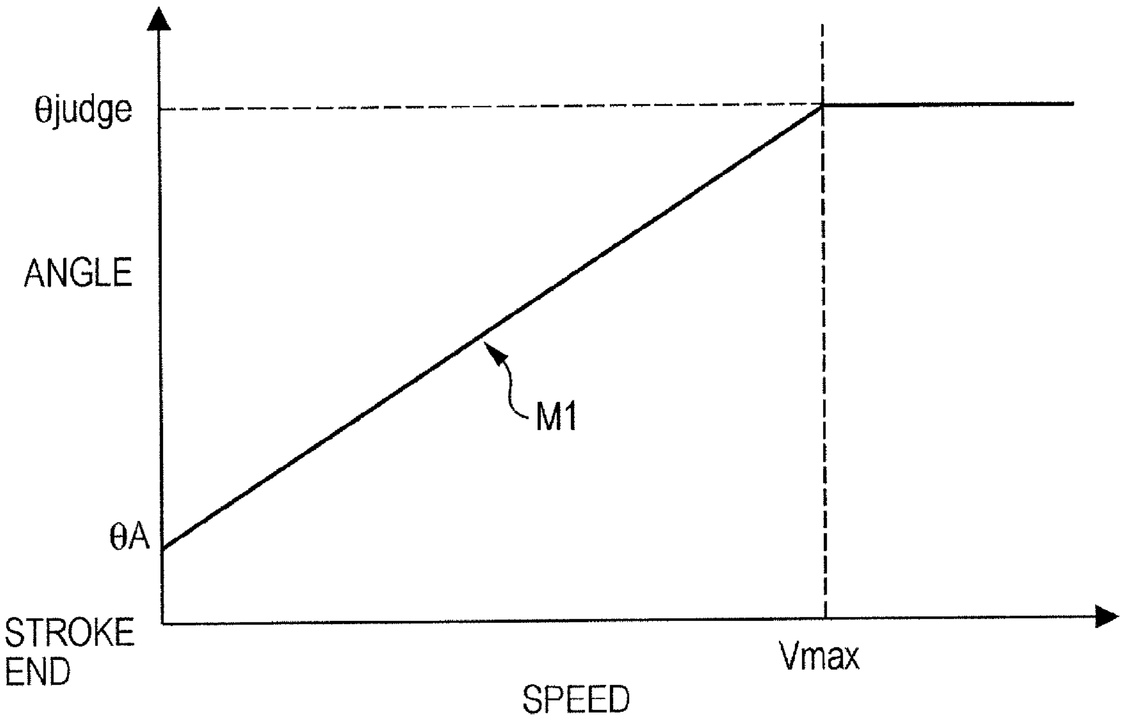
FIG. 6 illustrates a start-angle map used in the process shown in FIG. 5.

On the other hand, when it is determined that the rod 19 is extended in Step S3 (YES in Step S3), it is determined whether the rotation angle θ(n) is smaller than or equal to a predetermined judgment angle θjudge (Step S4). Herein, as shown in FIG. 6, the judgment angle θjudge is a rotational angle of the arm 7 that is set on the basis of the position at which the deceleration of the rod 19 should be started when the rod 19 is extending at an expected maximum speed Vmax. In this embodiment, the judgment angle θjudge is set depending on the maximum speed Vmax, but may be set to a larger value at which the rod 19 is further contracted.

In Step S4, when it is determined that the rotation angle θ(n) is larger than the judgment angle θjudge (NO in Step S4), the process returns to Step S1. On the other hand, when it is determined that the rotation angle θ(n) is smaller than or equal to the judgment angle θjudge (YES in Step S4), the average speed of the arm 7 is calculated on the basis of the five previous angle differences Δθ(n), . . . , and Δθ(n−5) (Step S5).

Next, a deceleration-start angle θB is determined on the basis of the average moving speed calculated in Step S5 and a start-angle map M1 that is retained beforehand (Step S6).

Herein, as shown in FIG. 6, the start-angle map M1 is a map defined on the basis of the speed and the angle of the arm 7. Specifically, the start-angle map is a data group lying on a straight line connecting the expected maximum speed Vmax at the judgment angle θjudge and a preset angle θA of the arm 7 at which the speed is 0.

When the deceleration-start angle θB is determined, a current map M2 for determining the supply current to the proportional solenoid valve 29 is formed on the basis of the deceleration-start angle θB.

Figure 7:
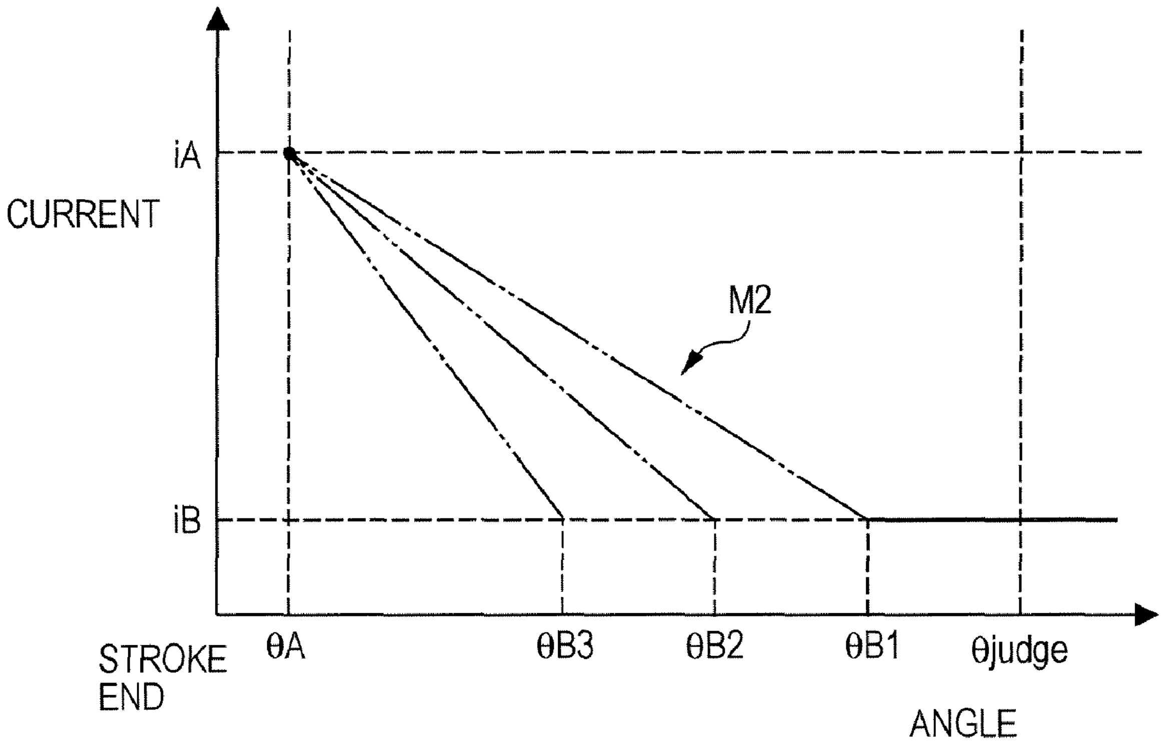
FIG. 7 illustrates a current map used in the process shown in FIG. 5.

Herein, as shown in FIG. 7, the current map M2 is a map defined on the basis of the values of the deceleration-start angle θB and illustrating values of the supply current supplied to the proportional solenoid valve 29 depending on the rotational angle of the arm 7. That is, the current map M2 is a data group lying on a straight line connecting a current value iA that is preset as a value of a current supplied to the proportional solenoid valve 29 at the angle θA (see FIG. 6) and the deceleration-start angle θB determined in Step S6. In short, the inclination of the current map M2 (deceleration) becomes gentler as the deceleration-start angle θB determined in Step S6 becomes larger (for example, θB1 in FIG. 7), whereas the inclination of the current map M2 becomes steeper as the deceleration-start angle θB becomes smaller (for example, θB3 in FIG. 7).

Then, a supply current i(n) supplied to the proportional solenoid valve 29 is determined on the basis of this current map M2 (Step S7), and, subsequently, the maximum flow rate of the working oil supplied from the three-position switching valves 24 to the arm cylinder 11 is determined according to the supply current i(n). Furthermore, on the basis of this maximum flow rate, a supply current imax supplied to the flow-adjusting sections 27 of the pumps 25 is calculated (Step S8).

That is, the pilot pressure applied to the three-position switching valve 24B is reduced by supplying the supply current i(n) to the proportional solenoid valve 29, and therefore, the flow rate of the working oil supplied from the three-position switching valve 24B to the arm cylinder 11 is reduced. However, this causes a difference between the upstream pressure and the downstream pressure of the three-position switching valve 24B, and may cause instability of the accuracy of the flow rate. Accordingly, the maximum flow rate of the working oil supplied to the arm cylinder 11 is determined on the basis of the supply current i(n), and the supply current imax supplied to the flow-adjusting sections 27 is calculated such that the pumps 25 discharge the working oil at a rate depending on the maximum flow rate.

Next, it is determined whether supply currents ip1 and ip2 supplied to the corresponding flow-adjusting sections 27 at this time are larger than the supply current imax calculated in Step S8 (Step S9). When it is determined that the supply currents ip1 and ip2 are larger than the supply current imax in this step (YES in Step S9), the supply currents supplied to the flow-adjusting sections 27 are set to the supply current imax (Step S10).

That is, the supply currents ip1 and ip2 depending on the inclination of the lever 26*a* of the remote-control valve 26 are supplied to the corresponding flow-adjusting sections 27, but when the supply currents ip1 and ip2 are larger than the supply current imax, it is determined that excessive working oil is discharged from the pumps 25 against the flow adjustment at the three-position switching valves 24. Thus, the excessive discharge of the working oil is omitted.

After the determination of NO in Step S9, or after the supply currents ip1 and ip2 are set to the supply current imax, it is determined whether the rotation-angle sensor 14 or the proportional solenoid valve 29 is under an abnormal condition (Step S11).

In a method for detecting an abnormal condition of the rotation-angle sensor 14, for example, detection results of the rotational angle of the arm 7 are output to the controller 16 at a predetermined voltage. When the rotation-angle sensor 14 has an angle-voltage characteristic with a voltage output range from 0.5 to 4.5 V, an output of 0 V is determined as a ground fault, and an output of 5 V is determined as a short-circuit to the power supply. In this manner, an abnormal condition can be determined. On the other hand, in a method for detecting an abnormal condition of the proportional solenoid valve 29, for example, a feedback resistance is provided for the controller 16. When an output expected from the feedback resistance is not obtained from the proportional solenoid valve 29, it can be determined that the proportional solenoid valve 29 is under an abnormal condition.

When it is determined that the rotation-angle sensor 14 or the proportional solenoid valve 29 is under an abnormal condition (YES in Step S11), the supply current ip1 supplied to the flow-adjusting section 27 of the pump 25A connected to the three-position switching valve 24A, which is not controlled by the proportional solenoid valve 29, is set to the minimum value (Step S12). Thus, the arm cylinder 11 can be reliably decelerated even if the deceleration control of the arm cylinder 11 cannot be normally performed on the basis of the rotational angle of the arm 7.

When it is determined that the rotation-angle sensor 14 and the proportional solenoid valve 29 are not under an abnormal condition (NO in Step S11), or after Step S12, the supply current i(n) is supplied to the proportional solenoid valve 29, and at the same time, the supply currents ip1 and ip2 (both are imax when set in Step S10) are supplied to the corresponding flow-adjusting sections 27 (Step S13). When the supply current ip1 is set to the minimum value in Step S12, this value is retained in Step S13.

According to this Step S13, the deceleration process is started from the deceleration-start angle θB depending on the speed of the arm 7 while the arm 7 is moved from a position corresponding to the rotational angle smaller than or equal to the judgment angle θjudge to the stroke end of the arm cylinder 11.

As described above, according to the control device 5, the deceleration-start position of the piston 18 can be set further from the stroke end as the moving speed becomes larger. Since the piston 18 that approaches the stroke end at a high speed is decelerated in good time, the force depending on the inertia of the piston 18 can be canceled before the stroke end, thereby preventing the internal pressure of the cylinder body 17 from excessively increasing.

Therefore, according to the control device 5, damage to the arm cylinder 11 can be prevented regardless of the moving speed of the piston 18 by regulating the excessive rise in the internal pressure of the cylinder body 17.

Specifically, according to the control device 5, the piston 18 of the arm cylinder 11 can be decelerated by reducing the supply rate of the working oil supplied to the arm cylinder 11 and the discharge rate of the working oil discharged from the arm cylinder 11 using the three-position switching valves 24.

At this time, the discharge flow rate of the working oil discharged from the pumps 25 can be reduced during the deceleration control of the piston 18 in which the supply rate of the working oil supplied to the arm cylinder 11 is regulated by operating the flow-adjusting sections 27 such that the discharge flow rate of the working oil discharged from the pumps 25 is reduced in response to the supply rate of the working oil supplied to the arm cylinder 11, the supply rate being adjusted by the three-position switching valves 24, as in the control device 5. As a result, the rates of upstream supply and downstream supply of the working oil having the three-position switching valve 24B interposed therebetween can be balanced, and thus the deceleration control of the piston 18 can be improved.

According to the control device 5 including the remote-control valve 26 and the proportional solenoid valve 29, the common arm cylinder 11 can be driven by two pumps 25 such that a large driving force is applied to the arm cylinder 11 during normal operation. On the other hand, the piston 18 can be decelerated by reducing the supply rate of the working oil supplied to the arm cylinder 11 and the discharge rate of the working oil discharged from the arm cylinder 11 using the pump 25B during the deceleration control of the piston 18 while the pump 25A, one of the two pumps 25, is continued to be driven in response to the operation of the remote-control valve 26.

When the rotation-angle sensor 14 or the proportional solenoid valve 29 is under an abnormal condition, the supply rate of the working oil supplied to the arm cylinder 11 and the discharge rate of the working oil discharged from the arm cylinder 11 are set to the minimum value by operating the three-position switching valve 24B, which is not driven by the proportional solenoid valve 29. With this, the piston 18 can be decelerated by the other three-position switching valve 24B even if it is determined that the three-position switching valve 24A cannot be controlled normally. Thus, higher safety can be achieved.

Furthermore, according to the control device 5, the arm cylinder 11 includes the mechanical cushioning means. Therefore, the piston 18 can be decelerated more reliably in addition to the deceleration control of the piston 18 by the controller 16.

In this embodiment, the deceleration control of the piston 18 is performed during extension of the rod 19. However, a similar control may be also performed during contraction of the rod 19.

Moreover, in this embodiment, the deceleration-start angle θB is determined on the basis of the start-angle map M1 (see FIG. 6) in which the deceleration-start angle is linearly changed in terms of the rotational speed. However, ranges of the deceleration-start angle may be set in terms of predetermined ranges of the rotational speed in a phased manner, and the deceleration-start angle may be determined using the range of the rotational speed in which the detected rotational speed is included. For example, when three ranges of the rotational speed are set and the actual rotational speed is included in the fastest speed range, the deceleration-start angle may be set to θB1 shown in FIG. 7. When the actual rotational speed is included in the second fastest speed range, the deceleration-start angle may be set to θB2 shown in FIG. 7. When the actual rotational speed is included in the third fastest speed range, the deceleration-start angle may be set to θB3 shown in FIG. 7.

In this embodiment, the piston 18 is decelerated by reducing the supply rate of the working oil supplied to the arm cylinder 11 and the discharge rate of the working oil discharged from the arm cylinder 11 using the three-position switching valves 24. However, the three-position switching valves 24 may be omitted, and the piston 18 may be decelerated by reducing the supply rate of the working oil supplied to the arm cylinder 11 using the flow-adjusting sections 27.

Although the invention has been described with reference to the preferred embodiments in the attached figures, it is noted that equivalents may be employed and substitutions made herein without departing from the scope of the invention as recited in the claims.

What is claimed is:

1. A control device for a hydraulic cylinder having a cylinder body and a piston that slides inside the cylinder body, the control device comprising:

a supply source that supplies working oil to the hydraulic cylinder;

decelerating means that decelerates the piston, wherein the decelerating means includes first flow-adjusting means for changing the supply rate of the working oil supplied to the hydraulic cylinder and the discharge rate of the working oil discharged from the hydraulic cylinder; and deceleration-setting means that sets a position at which the piston starts decelerating such that the position is set further from a stroke end as the moving speed of the piston becomes higher, wherein the deceleration-setting means includes detecting means for detecting the moving speed of the piston and flow-controlling means for reducing the piston speed by operating the first flow-adjusting means such that the supply rate and the discharge rate are reduced, wherein the control device decelerates the piston as the piston approaches the stroke end of the cylinder body by adjusting a supply rate of the working oil supplied from the supply source to the hydraulic cylinder by a second flow-adjusting means, wherein a pair of the supply source and the first flow-adjusting means comprises a plurality of such pairs;

the working oil from these pairs is joined and supplied to the common hydraulic cylinder, and the working oil discharged from the hydraulic cylinder is distributed to the corresponding first flow-adjusting means such that the flow rate is adjusted;

the decelerating means further includes operating means for operating the first flow-adjusting means and forced-operating means capable of forcedly operating at least one of the first flow-adjusting means independently of the operating status of the operating means; and the flow-controlling means reduces the supply rate of the working oil supplied to the hydraulic cylinder and the discharge rate of the working oil discharged from the hydraulic cylinder by controlling the forced-operating means during the deceleration control of the piston, wherein the flow-controlling means determines whether the detecting means or the forced-operating means is under an abnormal condition during the deceleration control of the piston; and when it is determined that the detecting means or the forced-operating means is under an abnormal condition, one of the second flow-adjusting means, which is related to the first flow-adjusting means not driven by the forced-operating means, is operated such that the supply rate of the working oil supplied to the hydraulic cylinder is minimized.

2. The control device according to claim 1, wherein the hydraulic cylinder includes mechanical cushioning means for decelerating the piston as the piston is moved from a predetermined cushioning-start position in a piston body to the stroke end by reducing the discharge rate of the working oil discharged from the hydraulic cylinder.

3. An operating machine comprising:

the control device for the hydraulic cylinder according to claim 1, wherein the hydraulic cylinder includes a rod that extends and contracts with respect to the piston body as the piston moves; and a working attachment is driven by extension and contraction of the rod.

* * * * *